United States Patent [19]

Carnevale et al.

[11] Patent Number: 5,687,337
[45] Date of Patent: Nov. 11, 1997

[54] MIXED-ENDIAN COMPUTER SYSTEM

[75] Inventors: Michael Joseph Carnevale, Rochester, Minn.; Martin Edward Hopkins, Chappaqua, N.Y.; Larry Wayne Loen, Rochester, Minn.; Edward John Silha, Austin, Tex.; Andrew Henry Wottreng, Rochester, Minn.

[73] Assignee: International Business Machines Corporation, Armonk, N.Y.

[21] Appl. No.: 394,072

[22] Filed: Feb. 24, 1995

[51] Int. Cl.⁶ .................................................. G06F 13/00
[52] U.S. Cl. ............................................................ 395/380
[58] Field of Search ...................... 364/DIG. 1 MS File, 364/DIG. 2 MS File; 395/376, 380, 381, 384, 385, 386, 387, 570, 800

[56] References Cited

U.S. PATENT DOCUMENTS

| | | | |
|---|---|---|---|
| 5,107,415 | 4/1992 | Sato et al. | 395/800 |
| 5,132,898 | 7/1992 | Sakamura et al. | 395/425 |
| 5,191,581 | 3/1993 | Woodbury et al. | 370/85.9 |
| 5,237,672 | 8/1993 | Ing-Simmons et al. | 395/425 |
| 5,251,312 | 10/1993 | Sodos | 395/425 |
| 5,261,077 | 11/1993 | Duval et al. | 395/500 |
| 5,287,470 | 2/1994 | Simpson | 395/425 |
| 5,313,231 | 5/1994 | Yin et al. | 345/199 |
| 5,398,328 | 3/1995 | Weber et al. | 395/500 |
| 5,408,664 | 4/1995 | Zarrin et al. | 395/700 |
| 5,446,482 | 8/1995 | Van Aken et al. | 395/199 |
| 5,519,842 | 5/1996 | Atallah et al. | 395/412 |
| 5,574,923 | 11/1996 | Heeb et al. | 395/800 |
| 5,574,927 | 11/1996 | Scantlin | 395/800 |

FOREIGN PATENT DOCUMENTS

| | | | |
|---|---|---|---|
| 0470570 | 2/1992 | European Pat. Off. | G06F 9/355 |
| 2229832 | 10/1990 | United Kingdom | G06F 7/00 |
| WO9415269 | 7/1994 | WIPO . | |

OTHER PUBLICATIONS

IEEE MICRO, vol. 14, No. 2, pp. 10–22, Steve Undy et al., "A Low–Cost Graphics and Multimedia Workstation Chip Set."

IEEE MICRO, vol. 10, No. 3, pp. 9–21, David V. James, "Multiplexed Busses: The Endian Wars Continue."

COMPCON Spring '93 IEEE Computer Society Int'l. Conference, IEEE/EE Publications Ondisc., Patrick Knebel et al., "HP's PA7100LC: A Low–Cost Superscalar PA–RISC Processor."

Journal of Controlled Release, vol. 28, No. 1/03, Jan. 1, 1994, pp. 37–44, XP000435238, C. D. Ebert et al., "Mucosal Delivery of Macromolecules".

*Primary Examiner*—Robert B. Harrell
*Attorney, Agent, or Firm*—Steven W. Roth

[57] ABSTRACT

A conventional bi-endian computer system is enhanced to include mixed-endian circuitry that allows the computer system to dynamically change its endian mode. The mixed-endian computer system can change endian mode on a task by task basis if necessary. The mixed-endian circuitry automatically formats the data in the form expected by the running task, regardless of whether the task expects the data to be in big endian format or in little endian format. The mixed-endian circuitry also formats big and little endian instructions such that they can execute on the same computer system.

10 Claims, 12 Drawing Sheets

```
Byte 0 ------> Byte 7
Byte 1 ------> Byte 6
Byte 2 ------> Byte 5
Byte 3 ------> Byte 4
Byte 4 ------> Byte 3
Byte 5 ------> Byte 2
Byte 6 ------> Byte 1
Byte 7 ------> Byte 0
```

FIG. 3A

| WORD SIZE | ADDRESS MODIFICATION |
|---|---|
| BYTE (8-BIT) | XOR 7 |
| HALF WORD (16-BIT) | XOR 6 |
| WORD (32-BIT) | XOR 4 |
| DOUBLE WORD (64-BIT) | XOR 0 |

FIG. 3B

| HitMissLE$_0$ | Hit$_0$ | HitMissLE$_1$ | Hit$_1$ | |
|---|---|---|---|---|
| 0 | 0 | 0 | 0 | REGULAR CACHE MISS ← 685 |
| 0 | 1 | X | X | CACHE HIT ON ARRAY ELEMENT 0 ← 687 |
| 0 | 0 | 0 | 1 | CACHE HIT ON ARRAY ELEMENT 1 ← 689 |
| 1 | 0 | X | X | LE MISMATCH ON ELEMENT 0 ← 691 |
| 0 | 0 | 1 | 0 | LE MISMATCH ON ELEMENT 1 ← 693 |

MIXED-ENDIAN COMPUTER SYSTEM

FIELD OF THE INVENTION

The present invention pertains generally to the field of data processing, and more particularly to the field of endian oriented computer systems.

BACKGROUND OF THE INVENTION

The earliest digital computers bit in the late 1940's had simple designs and components. Despite numerous advances in technology over the years, most modern day computers still use the same basic components to perform the same fundamental tasks of storing and manipulating information.

Two of these basic components are computer memory and a processor. Computer memory stores information being used by the computer, and works in much the same way as the memory of a person. For example, just as people can remember ideas about different topics and events, the memory of a computer system can be used to store words, numbers, pictures, and other forms of information.

A computer processor is the active component of the computer system. The processor operates on the information storm in the computer system's memory to carry out the task assigned to the computer system. The tasks being processed by the computer system are also sometimes called jobs, programs, or processes.

A computer processor running a job reads and processes information stored in computer memory in much the same way a person reads and processes the words printed on the page of a book. Therefore, just as the arrangement of words on a page is important to human readers, the arrangement of information in the computer system's memory is important to the computer system. For example, words in English are written from left to right and words in Hebrew are written from right to left. People who read only English are able to understand English words that are written from left to right and people who read only Hebrew are able to understand Hebrew words that are written from right to left. The fact that English words are written on a page from left to right does not mean that it is better to arrange words in this manner instead of arranging them from right to left. English words are written from left to right simply because English readers expect words to be written from left to fight. In this sense, the arrangement of information in the memory of a computer system is not different than the arrangement of words on a page. One way of arranging the information is not better than any other way of arranging the information. However, computer systems are also just like people in the sense that if the information is not arranged in a way that the computer system expects, the information cannot be understood by the computer system.

Of course, the fact that one way of arranging computer system information is not better than any other way of arranging the information has "opened the door" for different approaches to organizing information in computer system memory. It is no surprise, then, that computer system designers would at some point develop different schemes for organizing at least some forms of computer system information. One such divergence occurred some time ago for two particular forms of computer system information (called floating point information and binary integer information). At present, there are two common schemes for arranging these types of computer system information. The two schemes were dubbed "little endian" and "big endian" after the warring tribes from the famous book *Gulliver's Travels* written by Jonathan Swift. While the terms are colorful, they have no significance to computer systems beyond denoting how these types of information are arranged on a particular computer system.

In the late 1970's and early 1980's, INTEL CORPORATION introduced processors which became the standard for IBM PC and compatible personal computers. These computer systems used the so-called little endian arrangement. During this same time, other computer systems were designed using the so-called big endian arrangement. These later computer systems included processors manufactured by MOTOROLA Corporation and used in computer systems manufactured by APPLE Corporation.

In the past, the way computer systems organized information (in big or little endian format) within their memory was not a significant problem because it was not considered advantageous to arrange information in more than one way on a single computer system.

Today, however, the tremendous growth of computers used in businesses and homes has given rise to a serious need for compatibility between the different types of computer systems. For example, persons who use IBM PC or compatible computers cannot generally share computer programs and information with persons who use APPLE Macintosh computers, and vice versa. Large corporations which use both types of computers find it difficult to distribute information among employees. Small businesses often find that they cannot easily share information with suppliers or buyers who do not have the same type of computers. Consequently, computer software developers are often forced to devote additional time and resources to develop multiple versions of the same software so as to support different types of computer systems. In short, the inability to arrange certain types of information in more than one way on a single computer system has in large part resulted in delayed products, lost productivity, reduced efficiency, and increased capital expenditures.

Some existing computer systems do attempt to deal with the endian problem, but only in a limited fashion. These computer systems have what can be referred to as bi-endian capability. Essentially, bi-endian capability means that the same computer system can be made to execute either big endian tasks or little endian tasks, but not both types of tasks together. In other words, when the computer system is first started, the computer system is told whether it will be running big endian or little endian tasks (i.e., the computer system can be made to run in either big endian mode or little endian mode). Switching an existing bi-endian computer system's endian mode (i.e., big endian mode to little endian mode or vise versa) requires special purpose software that executes very early in the computer's initialization cycle (i.e., very close to start-up). Thereafter, all tasks will execute in the specified endian. For practical purposes, then, bi-endian computer systems are really equivalent to regular, "mono-endian," computer systems once they have completed their boot process.

While these bi-endian computer systems do provide additional flexibility by providing the ability to run either big endian or little endian tasks, they do not solve the problem associated with the need to allow tasks having different information format expectations (i.e., big versus little endian) to co-exist and execute, task for task, on a single computer system.

Without a computer system that can simultaneously run programs that have been created for little endian environments and others that have been created for big endian environments, the incompatibility problems of today will continue to plague the computer industry.

SUMMARY OF THE INVENTION

It is a principal object of this invention to provide an enhanced computer system that supports tasks of different endian without the need for reinitialization.

It is another object of this invention to provide an enhanced computer system that allows tasks having different information format expectations (i.e., big versus little endian) to co-exist and execute, task for task, on a single computer system.

It is yet another object of this invention to provide an enhanced computer system that allows big or little endian data to be storm on a single computer system such that it can be accessed by tasks that respectfully expect big or little endian data.

It is still another object of this invention to provide an enhanced computer system that allows tasks having different information format expectations (i.e., big versus little endian) to co-exist and execute, task for task, on a single computer system while respectively accessing data formatted in the alternate endian format.

It is still another object of this invention to provide an enhanced computer system that allows tasks having different information format expectations (i.e., big versus little endian) to co-exist and execute, task for task, on a single computer system while nonetheless providing a consistent main memory image in a multiprocessor environment.

A novel apparatus and method that allows tasks having different information format expectations (i.e., big versus little endian) to co-exist and execute, task for task, on a single computer system is disclosed herein. The computer system is referred to hereafter as a mixed-endian computer system.

The mixed-endian computer system of the present invention is an extension of an existing bi-endian computer system. Mixed-endian circuitry is added that allows the computer system to change its endian mode dynamically. The mixed-endian computer system can change endian mode on a task by task basis if necessary. The mixed-endian circuitry automatically formats the data in the form expected by the running task, regardless of whether the task expects the data to be in big endian format or in little endian format. The mixed-endian circuitry also formats big and little endian instructions such that they can execute on the same computer system.

BRIEF DESCRIPTION OF THE DRAWINGS

FIG. 3a is a table showing how data is reflected in the IBM PowerPC architecture.

FIG. 3b is a table showing how little endian addresses are modified in the IBM PowerPC architecture.

DETAILED DESCRIPTION OF THE PREFERRED EMBODIMENT

Overview

As previously discussed, the present invention pertains to the storage and use of big and little endian information on a single computer system. More specifically, the present invention is an enhanced computer system that allows tasks, having different endian expectations (i.e., either big or little) to not only co-exist on a single computer system, but to execute, task for task, on a single computer system as well.

A basic overview of the problem and solution is presented here so that the reader can fully appreciate the benefits and advantages of the present invention. A more detailed description of the inner-workings of this invention can be found in the "Detailed Description" section of this specification.

Figure 2A:
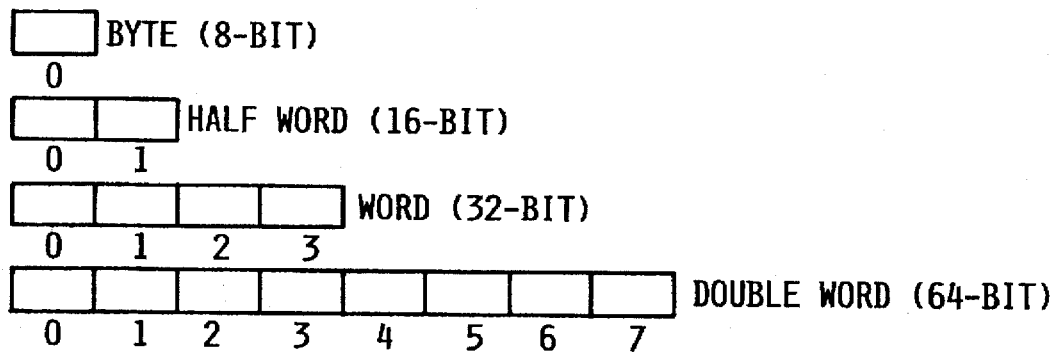
FIG. 2a is a data diagram showing data word sizes used in the IBM PowerPC architecture.
Figure 2B:
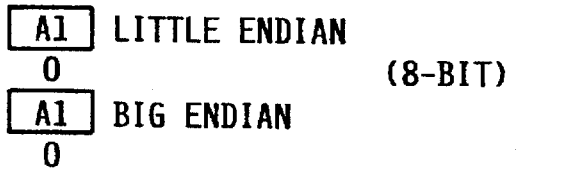
FIG. 2b is a data diagram showing big endian and little endian data formats.
Figure 2B:
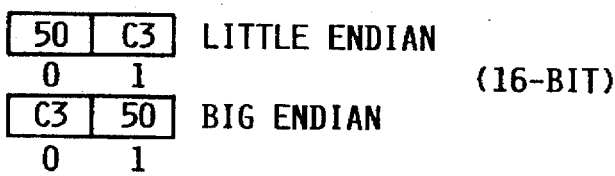
Figure 2B:
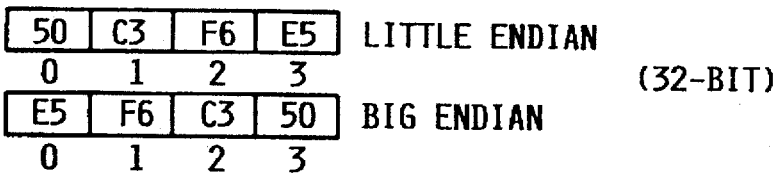
Figure 2B:
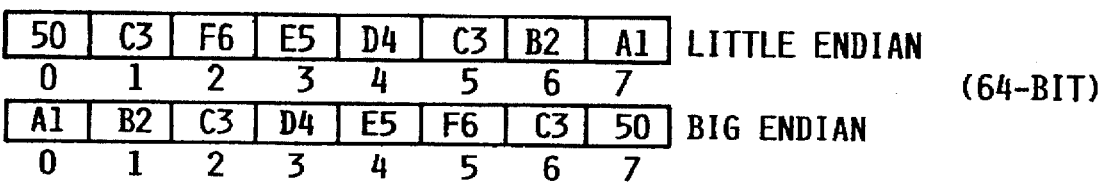

As shown in FIG. 2b, the big endian data format involves storing the most significant byte of the word at the lowest memory address, the next most significant at the lowest plus 1, and so on. For example, a 32-bit integer representing a decimal value of 50,000 is stored in hexadecimal in ascending bytes as 0000C350, where address offset 0 is 00 and offset 3 is 50. By contrast, the little endian format involves storing the least significant byte is stored at the lowest memory address, the next least significant at the lowest plus 1, and so on. For example, a 32-bit integer representing a decimal value of 50,000 is stored in hexadecimal in ascending bytes as 50C30000, where address offset 0 is 50 and offset 3 is 00.

Because of the endian problem, computer programs written to run on a little endian machine typically will not run on a big endian machine, and vice versa. For example, it is currently difficult to design a program which will operate modified when originally compiled for one endian and recompiled for the other endian, even when fully standardized languages are used. This is because language standards do not specify the endian of the data and always use the underlying endian of the computer system they compile for. Since programmers often overlay a given piece of storage with an alternate definition, source code that redefines storage may have to change to produce the same results when the underlying endian changes for a different machine, as the following C code segment illustrates:

```
typedef struct {
    int a;
    short int b;
    char c[5];
} example;
example x;
x.a = 0x01020304;
x.b = 0x1112;
strcpy(x.c,"\x21\x22\x23\x24");
```

On a little endian computer, information would be stored in memory as hexadecimal:

| offset | 0  | 1  | 2  | 3  | 4  | 5  | 6  | 7  | 8  | 9  | A  |
|--------|----|----|----|----|----|----|----|----|----|----|----|
|        | 04 | 03 | 02 | 01 | 12 | 11 | 21 | 22 | 23 | 24 | 00 |

On a big endian computer, the information would be stored in memory as hexadecimal:

| offset | 0  | 1  | 2  | 3  | 4  | 5  | 6  | 7  | 8  | 9  | A  |
|--------|----|----|----|----|----|----|----|----|----|----|----|
|        | 01 | 02 | 03 | 04 | 11 | 12 | 21 | 22 | 23 | 24 | 00 |

Now consider the following:

```
INT64 timestamp_whole;
typedef struct {
    INT32 upper;   /* time in seconds */
    INT32 lower;   /* the lower 32 bits of time (fraction of a second) */
} timestamp_split;
timestamp_split X = *(&(timestamp_split) timestamp_whole);
timestamp New;
New = X;
```

The data structure, "timestamp_split", is big endian because of how it overlays a 64-bit integer with two 32-bit integers. The setting of variables X and New only work correctly under big endian rules. In many time stamp formats, where the high order 32 bits are the time in seconds, the need to access the seconds conveniently necessitates such structures. However, any references to this data structure must be modified throughout the application if the program is moved to a little endian environment with a little endian timestamp. This is because the program above orders the words within a double word implicitly assuming big endian ordering, and this ordering remains in the same order, big endian dependent, even if recompiled for a little endian target machine, because timestamp_split formally describes the ordering as two adjacent four byte integers.

It is the encoding of ordering relationships of this kind, in many guises, which cause programs to have widely scattered dependency on the endian for which the program is first targeted. Unless carefully planned for in advance, programs developed on a system having one endian environment may be difficult and costly to port to a system having the other endian environment. Therefore, programs designed for execution on a system using one endian environment are rarely converted for execution on a computer system of the other environment.

For the purpose of illustration, a 32-bit word size is used throughout this overview, and corresponding portions of words are shown in FIG. 2a. It will be recognized, however, that computer systems utilizing other word sizes, such as 16-bit and 64-bit, may be used with the present invention without loss of generality.

As mentioned, some computer systems, called bi-endian computer systems, are able to change their external endian mode. Internally, however, a bi-endian computer system can be viewed as a computer system that is biased toward one particular endian, while at the same time including circuitry that provides the alternate endian mode. This circuitry is initialized by special purpose software to control the endian mode of the computer system. When the circuitry is initialized to operate in the alternate endian mode, reflection of the data takes place. The need for reflection is simply a consequence of how the bi-endian computer system handles the difference between big and little endian data formats. Therefore, once a bi-endian computer system is up and running, reflection either always occurs or never occurs, depending of course on whether the computer system has been told to run in its alternate endian mode.

The preferred processor of the present invention is an enhanced IBM PowerPC processor. The PowerPC architecture is described in the PowerPC Architecture Manual, May, 1993, IBM Corporation, Pub. No. SR28-5124-00, which is herein incorporated by reference. The bi-endian processors of the PowerPC (e.g., the Model 620) family are biased toward big endian. While a PowerPC bi-endian processor has been chosen for the preferred embodiment, those skilled in the art will appreciate that the present invention is not limited to any particular bi-endian processor and that the present invention is not limited to any particular endian bias.

Because IBM bi-endian PowerPC processors are biased toward big endian, they handle little endian tasks via a two step process. The first step is the aforementioned reflection. The reflection step essentially rearranges the data such that it can be accessed correctly given the big endian bias of the processors. The second step, called address modification, converts the addresses used to reference the data from big endian addresses to little endian addresses. At this point, it should be reiterated that the present invention is not limited to any particular endian bias. Accordingly, it should be understood that present invention applies equally to any bi-endian processor that, because of a little endian bias, handles big endian tasks through some type of reflection and address modification.

As has been discussed, there are two possible endian situations that exist when running in a mixed-endian processing environment. The first possibility is where the internal endian of the processor matches that of the software task. In this case, no conversion of software data is required, since the data byte order and data address offset can be read directly by the processor. The second possibility is where the internal endian of the processor does not match that of the software task. In this latter case, the aforementioned two-step process is used within PowerPC computer systems. These steps are illustrated in the tables shown as FIGS. 3a and 3b. The first step is a reflection which must be performed on the bytes comprising the data double word or fragment thereof (see FIG. 3a). The second step is a modification of the memory address offset of the bytes comprising the data double word to accommodate the new location of the bytes after the reflection that was performed in the first step (see FIG. 3b).

The reflection step may be performed in a variety of places, and is entirely mechanical and unrelated to the data element size being fetched. The reflection starts from storage which is presumed to be in the "true" endian format of the alternate endian, and is then reflected. This reflection is based on its relative offset within a natural addressed page, a real addressed page, or an associated cache line as an aligned double word or well-defined fragments thereof, as part of the fetch or store along the fetch/store data pathway prior to the second step of address modification. Referring to the table shown in FIG. 3a, byte 0 is exchanged with byte 7, byte 1 is exchanged with byte 6, byte 2 is exchanged with byte 5, and byte 3 is exchanged with byte 4. The result is that storage has now been changed from one endian to the other, but is residing at a different offset than expected by the programmer. It will be recognized that other reflections for word sizes other than 64-bits may be performed with the present invention without loss of generality.

The reflection shown in FIG. 3a and performed by mechanisms of the present invention is sometimes referred to as double word reflection, but whenever the word "reflection" appears without qualification it should be taken to refer to the double word reflection shown in FIG. 3a.

The second step performs an address modification which depends on the size of the data word which is being referenced by the processor. Referring to FIG. 3b, a preferred system performs an Exclusive-or (XOR) 7 operation during a 8-bit byte memory reference, an XOR 6 operation during a 16-bit half word memory reference, an XOR 4 operation during a 32-bit word memory reference, and an XOR 0 operation during a 64-bit memory reference. In the preferred embodiment of the present invention for either a 16-bit, 32-bit, or 64-bit word processor, the address offset modification is generalized by performing an appropriate XOR operation on the three least significant bits of the address offset.

FIGS. 4a through 4d show conversions from little endian to big endian format for the following example:

```
typedef struct {
    INT32 word;
    INT16 hword;
    BYTE byte;
    BYTE end;
} demo;
demo x;
x.word = 0x0000C350;
x.hword = 0xF1F2;
x.byte = 0xA1;
x.end = 0x00;
```

Figure 4A:
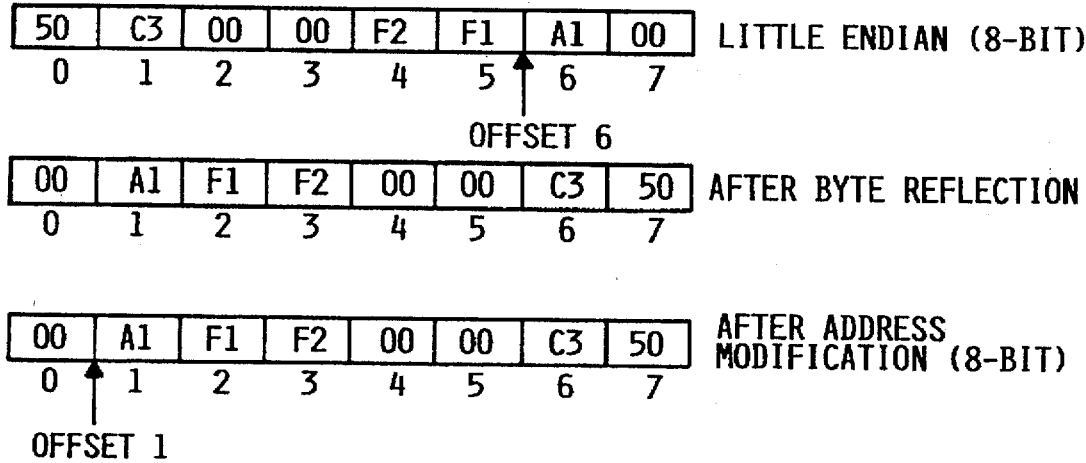
FIG. 4a is a data diagram showing how an 8-bit data item is fetched via the two-step little endian process used in bi-endian, PowerPC computer systems.
Figure 4B:
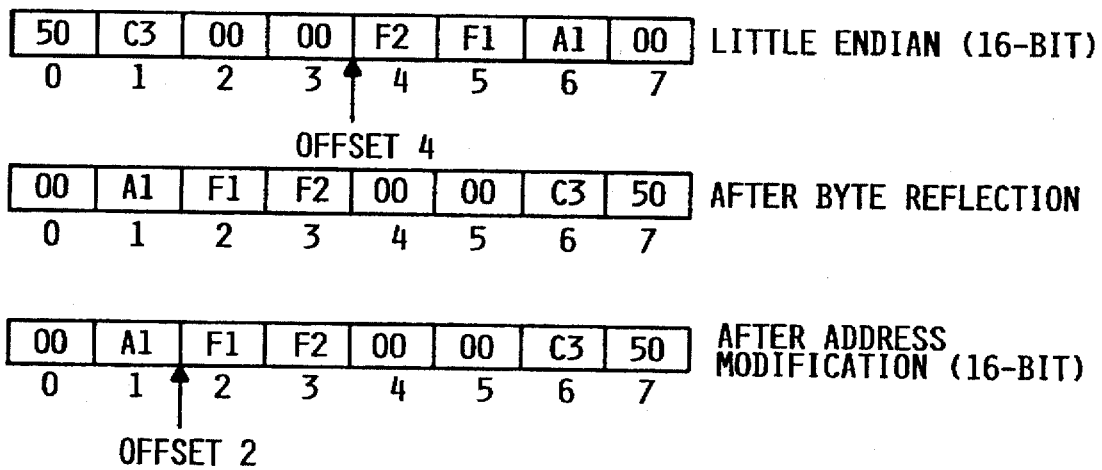
FIG. 4b is a data diagram showing how an aligned 16-bit data item is fetched via the two-step little endian process used in bi-endian, PowerPC computer systems.
Figure 4C:
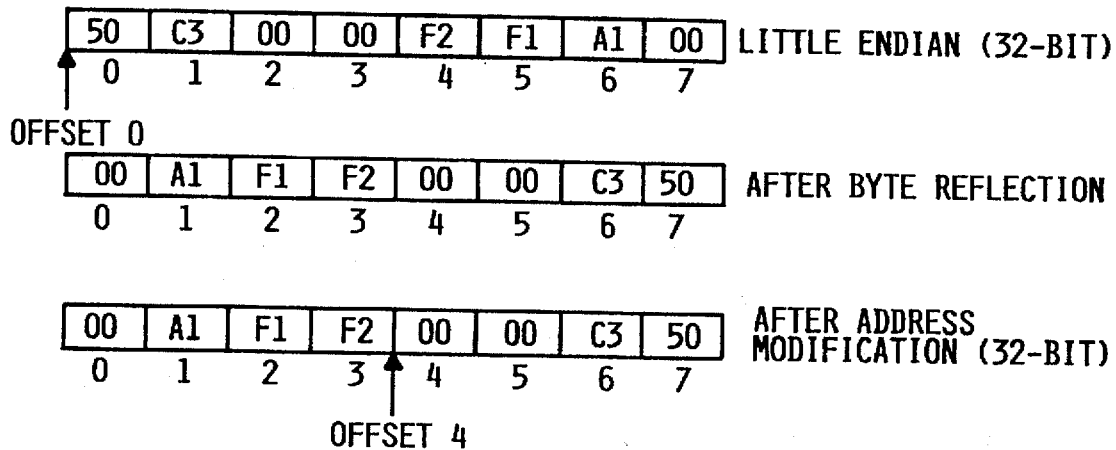
FIG. 4c is a data diagram showing how an aligned 32-bit data item is fetched via the two-step little endian process used in bi-endian, PowerPC computer systems.
Figure 4D:
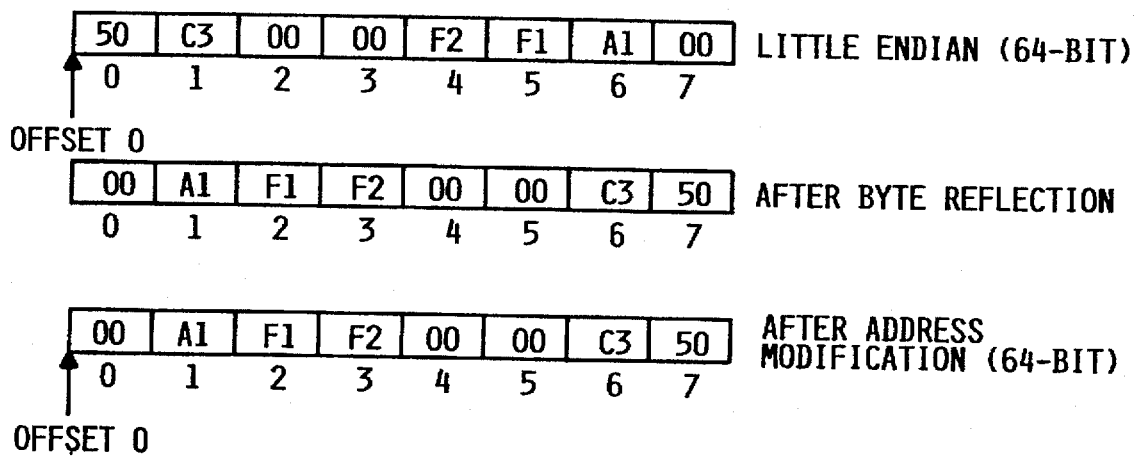
FIG. 4d is a data diagram showing how an aligned 64-bit data item is fetched via the two-step little endian process used in bi-endian, PowerPC computer systems.

For example, in FIG. 4c, a 32-bit word is shown reflected from little endian format to big endian format and its location has changed from offset 0 to offset 4 during a 32-bit word fetch. To complete the processor fetch from memory, an address modification is performed on the address as originally presented by the software. In this case, the fetch of a 32-bit word, the original address has an offset of 0. The processor takes the presented address and performs an XOR 4, which fetches the corresponding big endian word from offset 4. It will be recognized that by performing an XOR 7 for 8-bit byte memory reference, an XOR 6 operation during a 16-bit half word memory reference, an XOR 4 operation during a 32-bit word memory reference, and an XOR 0 operation during a 64-bit memory reference, that storage that began in little endian format before the first step and is first reflected as described above, corrects the original offset from what the original software specified to an internally correct offset to account for the reflection. Since these steps are hidden by PowerPC computer systems, a programmer cannot tell that the environment is anything other than true little endian. Additional examples of the two-step conversion process from little endian to big endian format, corresponding to 8-bit, 16-bit, and 64-bit memory references, are given in FIGS. 4a, 4b, and 4d.

Figure 5:
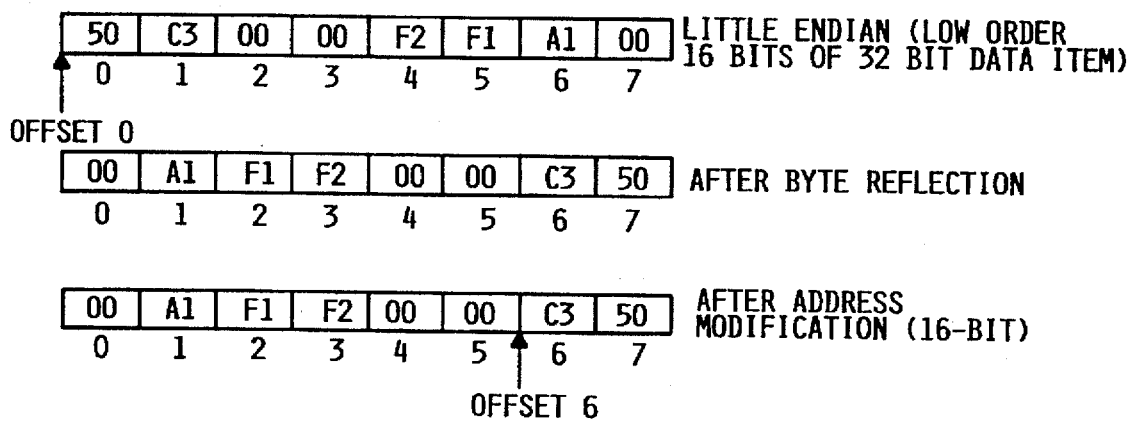
FIG. 5 demonstrates how the low order 16 bits of a 32-bit little endian integer may be fetched via the two-step little endian process used in bi-endian, PowerPC computer systems.

The PowerPC two-step conversion process described above also accommodates partial data reads. For example, FIG. 5 shows a fetch of the low order 16 bits, C3 50, of the 32-bit integer, 00 00 C3 50. Because the 32-bit integer is little endian, the software normally fetches the half word at offset 0, using standard little endian rules. The 16-bit memory reference of the 32-bit word is accommodated by first reflecting the 32-bit word from little endian format to big endian format, as previously described in FIG. 4c. Because the current memory reference is for a 16-bit value, an XOR 6 is then performed as described in FIG. 3b, which fetches the correct big endian half word from offset 6.

It will be recognized that the above description of an address offset modification is correct for word sizes of 16-bits, 32-bits, 64-bits, and extends readily to other word sizes. For example, a processor having a 128-bit word size performs a 16-byte word reflection in the first step, where byte 0 is exchanged with byte 15, byte 1 is exchanged with byte 14, byte 2 is exchanged with byte 13, byte 3 is exchanged with byte 12, byte 4 is exchanged with byte 11, byte 5 is exchanged with byte 10, byte 6 is exchanged with byte 9, and byte 7 is exchanged with byte 8. During the second step, the processor performs an XOR operation on the four least significant bits of the address offset, using in hexadecimal an XOR F for an 8-bit reference, an XOR E for a 16-bit reference, an XOR C for a 32-bit reference, an XOR 8 for a 64-bit reference, and an XOR 0 for a 128-bit reference.

One complexity involved in the design of a mixed-endian computer system is the difficulty associated with cache memory management. This difficulty arises when dam fetched under the endian of a first task is re-used while still in the cache under the endian of a second task. For example, if the data was fetched under little endian rules, the data in cache memory has been reflected in preparation for a forthcoming address modification. However, if the data was fetched under big endian rules, the data has not been reflected. At process switch time there is no easy way in existing hardware to determine whether the reflection has been done or not.

One intuitive solution might be to simply flush the cache every time the task changes. However, flushing the cache may adversely affect the performance of the computer system depending on the number of times a change of task results in the new task being of the alternate endian, something which is difficult to predict and control. The present invention is superior to flushing the cache at each task endian change because the present invention is insensitive to how often the task endian changes. In addition, the performance cost of flushing the cache may also vary based upon cache implementation factors such as line size and associativity. Accordingly the present invention is also superior to flushing the cache at each task endian change because it does not limit potential cache design choices.

The present invention is an enhancement to existing IBM bi-endian PowerPC computer systems. Mixed-endian circuitry has been added to the processor to control and track reflection and address modification on a task basis. When a running task loads information from main memory into cache memory, the mixed-endian circuitry of the present invention stores the endian of the task in the cache line along with the information. When a task then goes to fetch the information from cache memory (i.e., the same or a different task), the mixed-endian circuitry of the present invention determines if the endian of the fetching task matches that of the information. If so, the normal fetch is allowed to proceed. It is only when the endian of the fetching task does not match that of the information that the mixed-endian circuitry of the present invention forces a cache miss. After the cache miss, the information is loaded into cache memory in the appropriate format and fetched by the running task in the normal manner.

In addition to controlling and tracking reflection and address modification, the present invention also provides a mechanism for handling context switching during interrupt processing. Since the mixed-endian circuitry of the present invention allows both big and little endian tasks to reside and execute, task for task, on a single computer system, and since interrupt handling software will itself be of a particular endian, the present invention provides a means for allowing interrupt routines to take control of the processor under their own endian while nonetheless preserving the endian of the suspended task.

DETAILED DESCRIPTION

Figure 1:
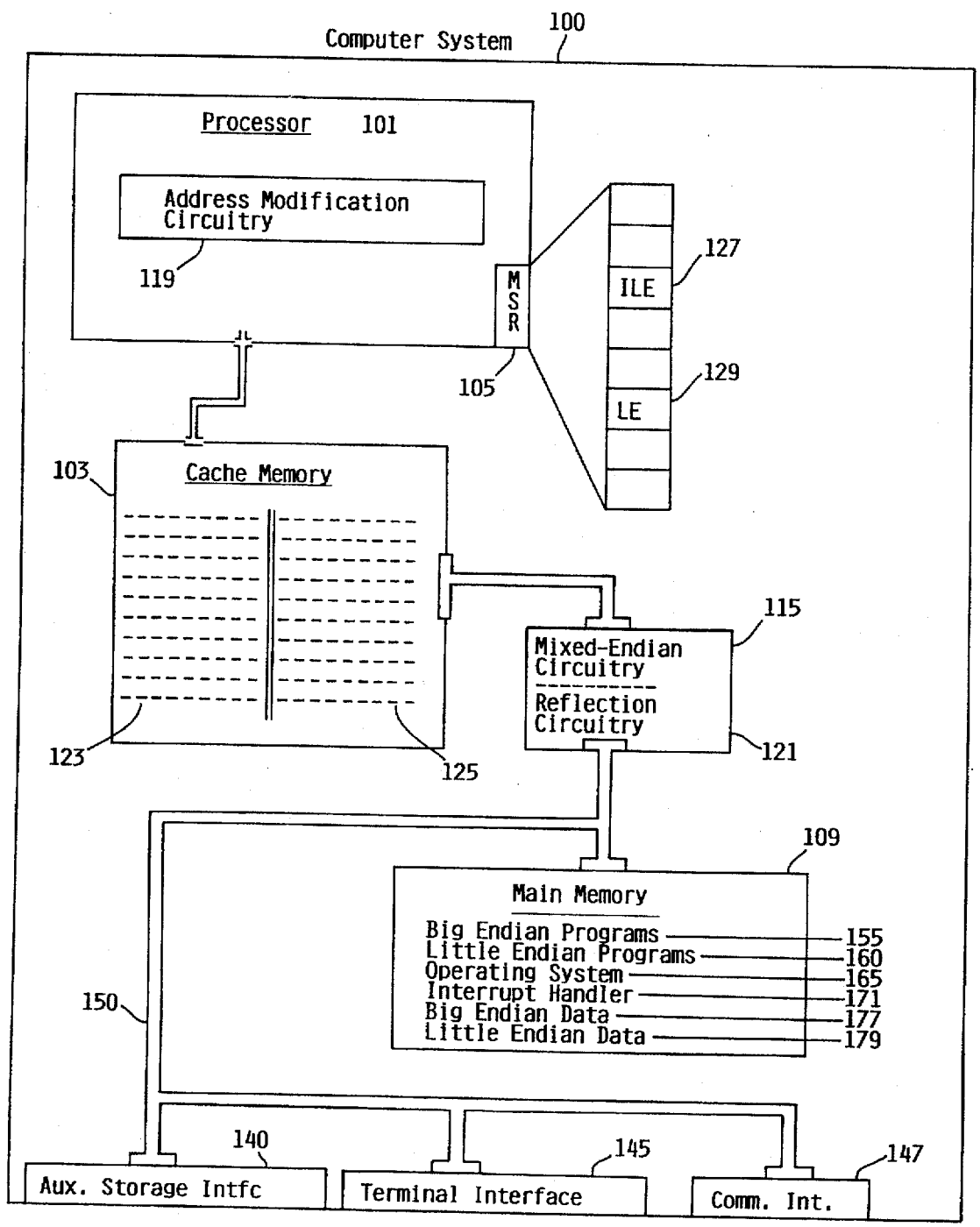
FIG. 1 is block diagram showing the computer system of the preferred embodiment.

FIG. 1 shows a block diagram of the computer system of the present invention. The computer system of the preferred embodiment is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. As shown in the exploded view of FIG. 1, computer system 100 comprises processor 101 connected to system bus 150 via cache memory 103 and mixed-endian circuitry 175, including reflection circuitry 121. Main memory 109, auxiliary storage interface 140, terminal interface 145, and communications interface 147 are also shown to be connected to system bus 150.

Processor 101 comprises address modification circuitry 119, and machine state register (MSR) 105. Processor 101 is an enhanced IBM bi-endian PowerPC processor; however, any two step, bi-endian processor could be used. Address modification circuitry 119 is responsible for performing the aforementioned address modification; however, its function could also have been implemented in software. MSR 105, which contains current task information associated processor 101, also contains little endian (LE) status bit 129 and interrupt little endian (ILE) status bit 127. LE bit 129 indicates whether a reflection and address modification should be performed during a memory reference. The value of LE bit 129 is set by operating system 165 to reflect the endian of the current task running on processor 101. In the mixed endian environment of the present invention, the value of LE bit 129 varies in real time as software tasks of different endian execute on processor 101.

ILE bit 127 indicates the state LE bit 129 is to become upon receiving a processor interrupt. ILE bit 127 reflects the endian chosen for the software interrupt handler. The change of endian, if any, must be part of the interrupt process when changing from that of an application program endian (i.e. big endian programs 155 or little endian programs 160) to the interrupt handling endian. The value of ILE bit 127 is preferably only required to be set once by the operating system upon initial start-up of computer system 100 to reflect the choice of the interrupt handler endian. The value of ILE bit 127 typically does not change in real time because the endian bias of the interrupt handler typically does not change after initial start-up. It is possible to fix the value of the ILE bit 127 to a constant value without loss of generality. However, this would have the side-effect of forcing the interrupt handler, and possibly the system software, to be of a particular endian.

Cache memory 103 comprises reflection circuit 121 and cache arrays 123 and 125. Cache memory 103 is a two way associative, copy-back cache; however, those skilled in the art will appreciate that the present invention is not limited to any particular cache mechanism. Cache arrays 123 and 125 each contain a plurality of cache array elements. As is known in the art, each cache array element contains a cache line, which contains the actual data, and certain control information.

Mixed-endian circuitry 175 which comprises reflection circuit 121, is essentially responsible for dynamically controlling and tracking the two step process of PowerPC processor 101. However, those skilled in the art will appreciate that the spirit and scope of the present invention is not limited to the specific two step process that is used in bi-endian, PowerPC computer systems. Indeed, the mechanisms disclosed herein are equally applicable to any adjustment of data and addresses, regardless of the number or specifics of the steps taken.

Reflection circuitry 121 is capable of performing a reflection of data read from main memory 109 into cache memory 103, as described in the overview section of this specification and in FIGS. 3a through 5. Those skilled in the art will recognize that it is possible to implement reflection circuitry 121 in software running on the cache memory controller associated with cache memory 103 (not shown) without loss of generality.

Main memory 109 contains big endian programs 155, little endian programs 160, operating system 165, interrupt handler 171, big endian data 177, little endian data 179, and other programs (not shown). Big endian programs 155 are programs that designed to expect and operate with big endian data 177, while little endian programs are designed to expect and operate with little endian data 179. In special cases, however, programs can be designed to expect and operate with data of the alternate endian. Operating system 165 is an enhanced IBM MicroKernel based, multi-tasking operating system; however, any appropriate multi-tasking operating system could be used. As will be described in detail in the text associated with FIG. 7, hardware interrupt mechanism has been enhanced to utilize ILE bit 127 of the present invention.

Auxiliary storage interface 140 is used to interface computer system 100 with auxiliary storage devices such as magnetic or optical storage devices.

Terminal interface 145 allows system administrators and computer programmers to communicate with computer system 100, normally through programmable workstations. Communications interface 147 is used to interface computer system 100 with external communications networks such as local area networks (LANs) and wide area networks (WANs). Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional communication could be used.

Mixed-Endian Operation

When processor 101 is running, the normal process of performing a data fetch is shown in FIGS. 6a through 6f.

Since the processor of the preferred embodiment is an enhanced IBM bi-endian PowerPC processor, the steps shown in the following figures are described for a processor having an internal endian bias of big endian. The following discussion of FIGS. 6a through 6f explain how data is fetched and stored by the mixed-endian computer system of the present invention. While this description has been limited to a discussion of data fetch, data store, and cache write back operations, those skilled in the art will appreciate that the mechanisms of the present invention can be readily extended to handle instruction fetch operations.

Prior to any fetch or data store operation, the operating system directs processor 101 to set the value of LE bit 129 such that it represents the endian of the running task.

Figure 6A:
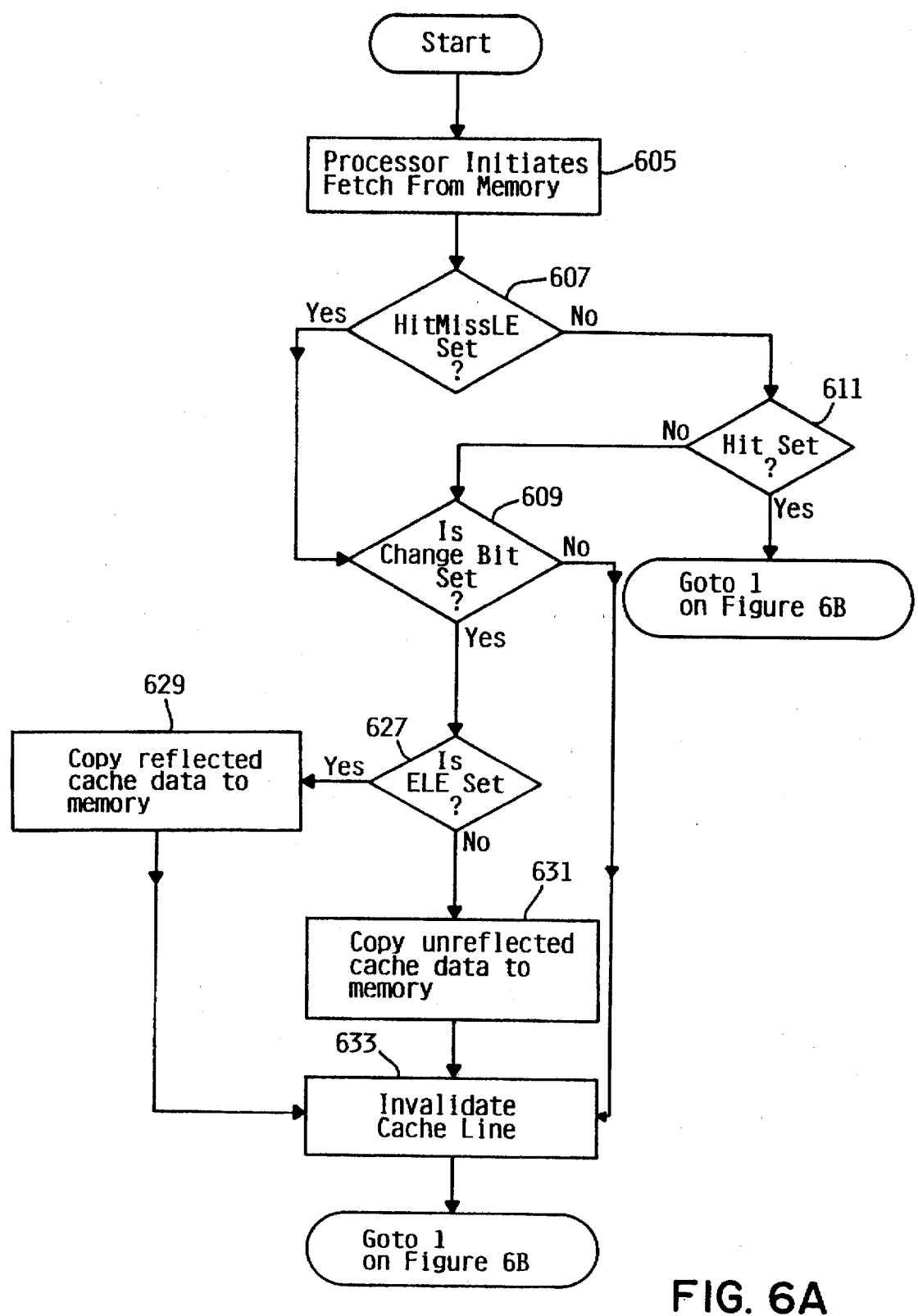
FIGS. 6a and 6b are high level logic flow diagrams that describe the mixed-endian circuitry of the preferred embodiment.

Data Fetch and Store Operation [Block 605 of FIG. 6a]

Figure 6B:
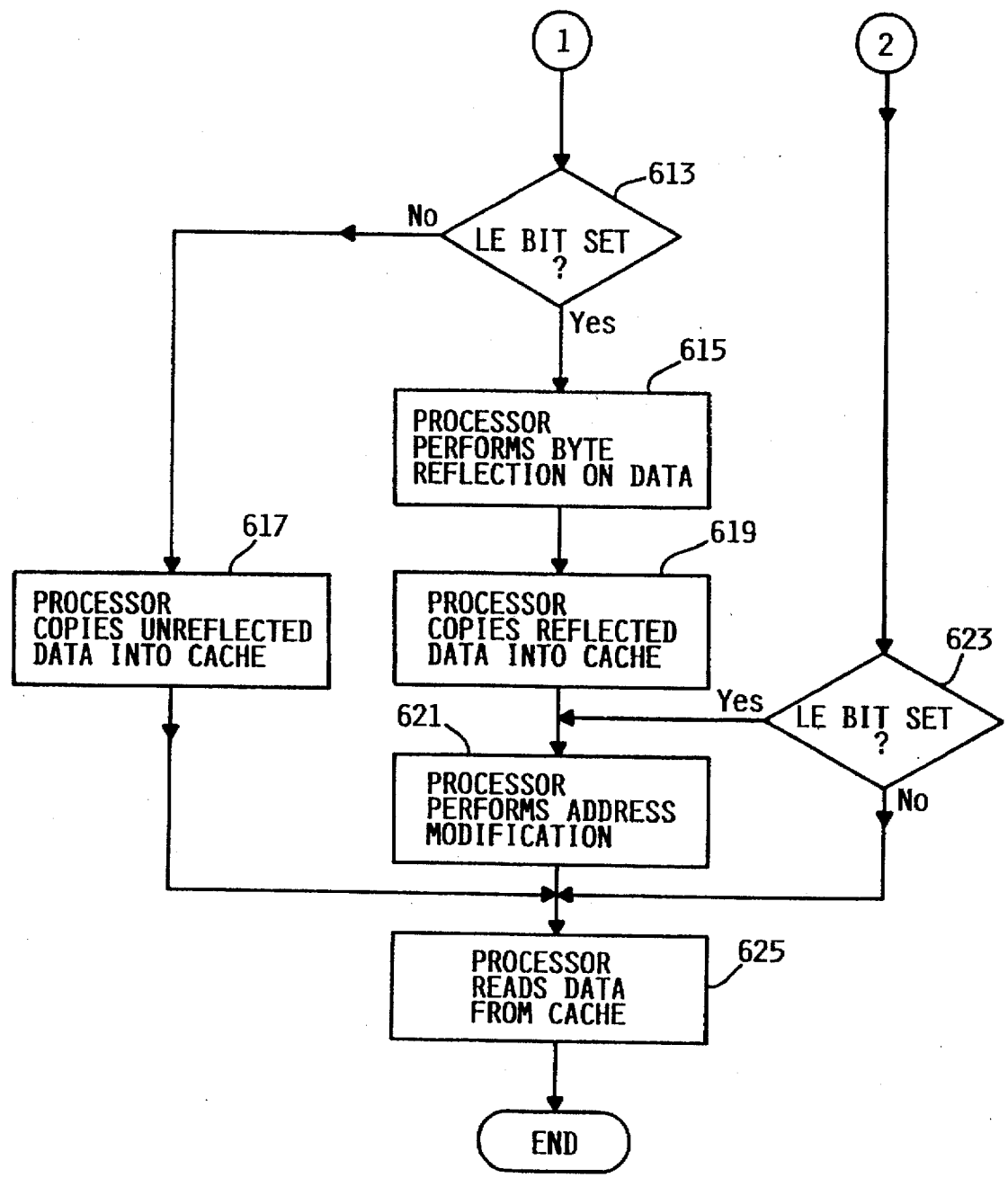

FIGS. 6a and 6b are logic flow diagrams of mixed-endian circuitry 175. Since those skilled in the art will appreciate that there are any number of equivalent ways to design the high level logic flow described in these figures, specific hardware schematic diagrams are not described herein. In block 605 of FIG. 6a, processor 101 initiates a fetch from memory. This causes processor 101 to access cache memory 103. There are three possible memory reference scenarios that result from the access of cache memory 103 by processor 101. However, since the processing of block 605 of FIG. 6a is common to all three scenarios, a generic description of the inner-workings of block 605 is presented first.

Figure 6C:
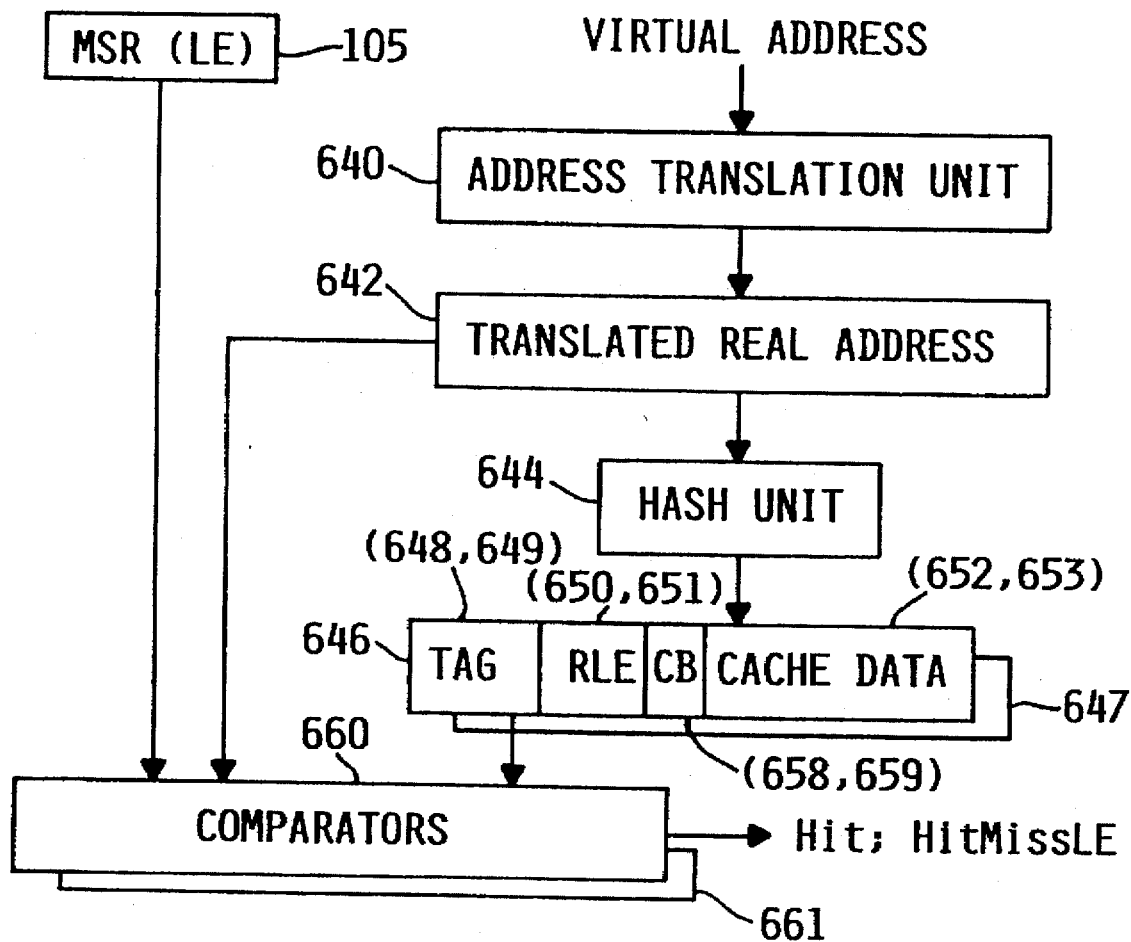
FIGS. 6c and 6d are schematic diagrams showing the key elements of the mixed-endian circuitry of the preferred embodiment.
Figure 6D:
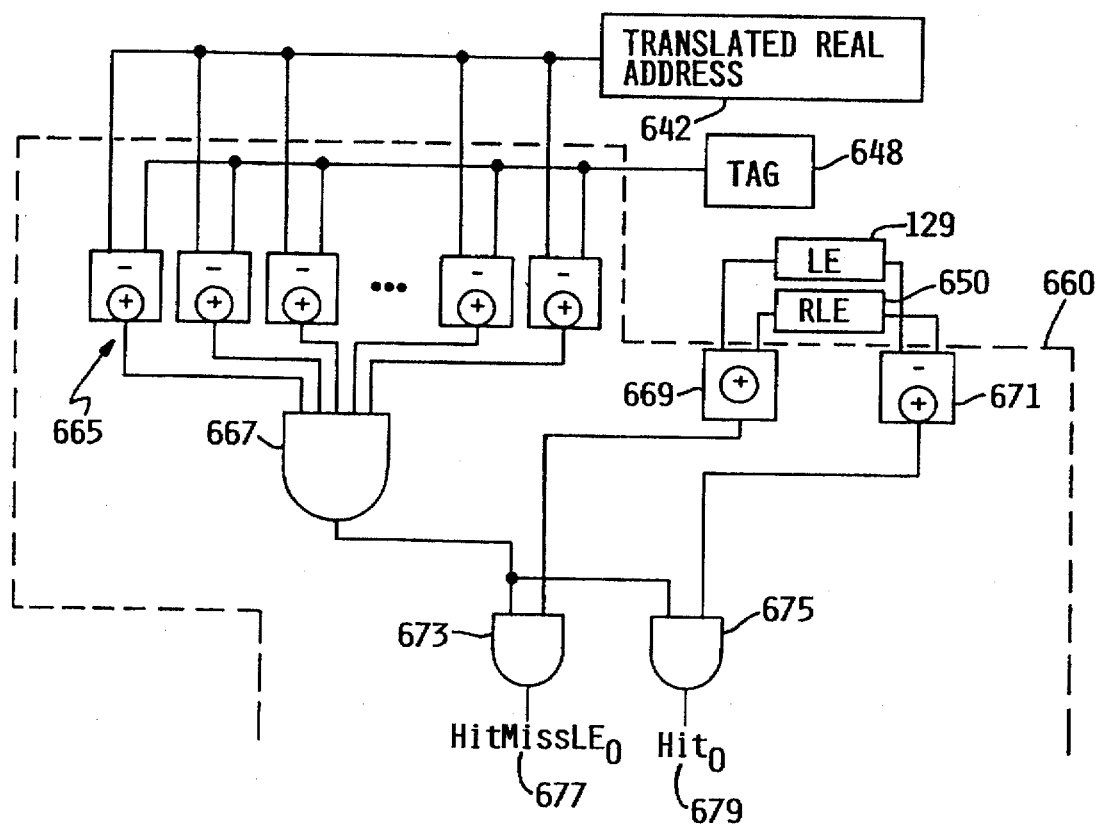
Figures 6E, 6F:
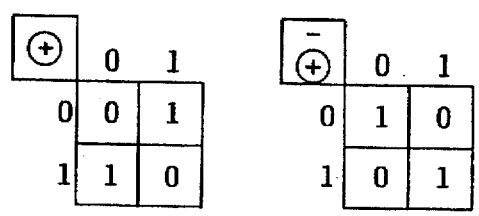
FIG. 6e shows the truth-tables for the well-known exclusive OR (XOR) and exclusive NOR (XNOR) logical operations, described by the objects shown in FIG. 6d.
FIG. 6f shows relevant combinations of the outputs of the comparators shown in FIGS. 6c and 6d.

FIGS. 6c through 6f show an exploded schematic view of block 605 of FIG. 6a. FIG. 6c and 6d show the key elements of mixed-endian circuitry 175 that are used to allow tasks having different information format expectations (i.e., big versus little endian) to co-exist and execute, task for task, on a single computer system. A relevant subset of the preferred cache management logic for the present invention is shown. For the purpose of illustration, FIG. 6c describes a two-way associative, copy-back cache, but it will be recognized by those skilled in the art that the present invention may be extended to other cache designs without loss of generality. FIG. 6d is a logic schematic showing address comparator 660 (parallel address comparator 661, which has identical circuitry, with outputs HitMissLE$_1$ and Hit$_1$ is not shown). FIG. 6e shows the truth-tables for the well-known exclusive OR (XOR) and exclusive NOR (XNOR) logical operations, described by the objects shown in FIG. 6d. It will be recognized that construction of these type of logical circuits is well-known in the art. FIG. 6f shows relevant combinations of the outputs of the comparators shown in FIG. 6d.

The processing described in FIG. 6c begins with a virtual address being presented to address translation unit 640. The virtual address is the address of the data that the running task is directing processor 101 to fetch. Those skilled in the art will recognize that the present invention is not limited to any particular virtual translation mechanism and that any of the many virtual address translation architectures (including the complete absence of virtual address translation altogether) may be used. The output of address translation unit 640 (i.e., the translated real address) is copied into translated real address register 642. The translated real address is then presented to hash unit 644 and to comparators 660 and 661.

Hash unit 644 uses the translated real address (i.e., the contents of translated real address register 642) to determine which two array elements of cache memory 103 might hold the cache array element for the address currently held in register 642. Since for the purpose of the present invention any suitable hashing mechanism may be used, details of hashing mechanisms are not set forth herein.

FIG. 6d shows an exploded view of comparator 660. To avoid redundant description, comparator 661, which contains identical circuitry, is not shown or described in detail. However, those skilled in the art will understand that the operations being performed by comparator circuit 660 are actually occurring in parallel in comparator circuit 661. The tag value (e.g., tag 648) associated with one of the two array elements identified by hash unit 644 (e.g., 646) is transferred, bit by bit, to the exclusive NOR circuits 665 of comparator 660. The corresponding address bit from tags 648 or 649 are exclusive "NOR-ed" with the corresponding address bit from the translated real address contained in register 642 of FIG. 6c. The result of these logical operations is fed into AND gate 667. If the output of AND gate 667 is a logical 1, it means that the addresses in the corresponding cache array element match that of the translated real address contained in register 642, where address bit 0 of the tag corresponds to address bit 0 of the latched address in latch 642, bit 1 corresponds to bit 1, etc., for as many bits as are required to define a unique real address in the hardware implementation. Of course, this means that the information needed by processor 101 resides in cache memory 103. However, the fact that the needed information resides in cache memory 103 does not mean that the information is arranged in the form expected by the running task (i.e., reflected or not).

LE bit 129 and Remembered LE (RLE) bit 650 are used to determine whether the information located in the cache memory 103 (i.e., in one of the cache array elements identified by hash unit 644) has been stored in the expected format. RLE bits 650 and 651 (RLE bit 651 is not shown) in the two cache lines whose address is being compared is set and remembered as one of the control lines set in the cache array when the current members of the two cache lines are initialized and validated. The remembered value is that of the MSR's LE bit when the cache line was initialized (i.e., corresponds to the format of the data currently residing in the cache line). These remembered bits are important to the present invention, because they enable mixed-endian circuitry 175 to remember and account for whether a reflection was performed when the cache array dement was initially loaded.

As will be understood from the ensuing discussion, the purpose of the RLE bits is to enable the present invention to detect and manage when the data needed by the processor is actually present in a cache array element of cache memory 103, but is nonetheless in the wrong reflected format. To accomplish this intelligence, RLE bit 650 is exclusive NORed at 671, and exclusive ORed at 669 with the current MSR's LE bit (i.e., LE bit 129). The output of AND gate 667 and 669 are ANDed at AND gate 673, thus producing HitMissLE$_0$. The output of AND gate 667 is ANDed with the result of exclusive NOR gate 671 in AND gate 675, thus producing Hit$_0$ 679. Values HitMissLE$_0$, Hit$_0$, HitMissLE$_1$, and Hit$_1$ are the output of block 605 on FIG. 6a.

Table 6f shows the possible values of HitMissLE$_0$, Hit$_0$, HitMissLE$_1$, and Hit$_1$ and the meanings associated therewith. "X"s in the table denote "don't care" values. As shown at 685 a value of zero for all for values means that the information needed by processor 101 was not in cache memory 103, which means that a normal cache miss occurred. As shown at 687 and 689, a value of logical 1 for either Hit$_0$ or Hit$_1$, along with logical zero values for both HitMissLE$_0$ and HitMissLE$_1$, means that the data needed by processor 101 actually resides in cache memory 103 in the correct format. As shown at 691 and 693, a value of logical 1 for either HitMissLE$_0$ and HitMissLE$_1$, means that the data needed by processor 101 actually resides in cache memory 103, but in the wrong format.

Scenario I: Data Present—Correct Format

In this scenario, either $Hit_0$ or $Hit_1$ have a value of logical 1 and $HitMissLE_0$ and $HitMissLE_1$ both have a value of logical 0, which means that the data needed by processor 101 actually resides in cache memory 103 in the correct format. This being the case, block 607 (FIG. 6a) is answered negatively and block 611 is answered affirmatively. This causes flow of control to pass to block 623 of FIG. 6b. In block 623, LE bit 129 is checked to determine if the current task is a big endian task or a little endian task. Again, a value of logical 1 means that the current task is a little endian task and a value of 0 means that the running task is a big endian task. If LE bit 129 is zero, it is presumed the data was directly copied into cache memory 103 and so no address modification takes place. The fetch completes in block 625. If LE bit 129 is a logical one, it is presumed that data was previously reflected to accommodate a little endian task, so address modification is performed in block 621 and the fetch completes in block 625.

Scenario II: Data Present—Wrong Format

In this scenario, either $HitMissLE_0$ or $HitMissLE_1$ have a value of logical 1, which means that the data needed by processor 101 actually resides in cache memory 103, but in the wrong format for the running task. Of course, this means that the subject cache array element must be flushed and the appropriate data must be brought into cache memory 103 in the appropriate form. (Again, appropriate form means reflected or not reflected according to the needs of the requesting task.) This being the case, block 607 is answered affirmatively, which causes flow of control to pass to block 609. Block 609 determines whether the change bit (e.g., change bit 658 on FIG. 6c) of the corresponding array element (i.e., depending upon whether $HitMissLE_0$ or $HitMissLE_1$ have a value of logical 1) has been set. A change bit equal to logical 1 means that the data in the cache array element of cache memory 103 has been modified by a previous store such that the corresponding data in main memory 109 is no longer current. If so, the associated RLE bit is checked in block 627. If the RLE bit is set, the cache data is reflected (i.e., to invert the original reflection) and copied back into main memory 109 [block 629]. If the RLE bit is not set, the cache data is copied directly into main memory 109 since no reflection is necessary [block 631]. Once the cache data has been copied back into main memory 109, the cache array element is invalidated in block 633.

After the cache array dement has been flushed appropriately, the data reference continues in block 613 on FIG. 6b. In block 613, LE bit 129 is checked to determine if the current task is a big endian task or a little endian task. If the current task is a big endian task, processor 101 copies the needed data into cache memory 103 in block 617 and proceeds to fetch the data in block 625. However, if the running task is a little endian task, processor performs the reflection via reflection circuitry 121 [block 615], copies the reflected data into cache 103 [block 619], performs the address modification via address modification circuit 119 [block 621], and finally fetches the data from cache 103 in block 625. Note that in this scenario the present invention would reuse the flushed cache array element.

It should be noted here that the mechanisms of the present invention function properly regardless of the actual format of the data in main memory 109. Scenario II is a good example. For instance, assume that a big endian task (i.e., one of big endian programs 155) attempted to access data already located in cache memory 103, only to find the data in the wrong format (i.e., in reflected form). Assume further that this big endian task was designed to handle little endian data, and accordingly, it knowingly accesses data that is intrinsically little endian and expects to receive the data in true little endian format. However, the data is currently in cache memory in reflected form because it was previously loaded into cache memory 103 at the request of a little endian task. As has been described, the mechanisms of the present invention flush the cache array element and bring the data back into the same array element from main memory 109; this time in unreflected form (i.e., because it was brought in at the request of the big endian task). In other words, the fact that this particular big endian task expects little endian data is not problematic to the mechanisms of the present invention because the mechanisms are indifferent about the actual form of the data residing in main memory 109. This aspect of the invention is referred to as cross-endian data access or cross-endian data sharing, and the present invention precisely preserves the rules under which an application in one endian manipulates data intrinsically in the opposite endian, given that the hardware's fetch and store always do so under the application's own endian rules, a machine model expected to be true, even on monoendian machines.

Scenario III: Data not Present

In this scenario, the values of $HitMissLE_0$, $Hit_0$, $HitMissLE_1$, and $Hit_1$ all are logical 0, which means that the information needed by processor 101 does not reside in cache memory 103. This scenario is handled in the same way as Scenario II above except that the cache array element identified by hash unit 644 may not be the element that is actually flushed since it does not contain the information being fetched (i.e., even in the wrong format as in scenario II).

At this point, it should be noted for all three scenarios that the storing of data to cache memory 103 and ultimately to main memory 109 is performed using the same logic as the aforementioned fetch scenario except that block 625 of FIG. 6b is replaced with appropriate logic to write data from processor 101 into cache 103.

Those skilled in the art will appreciate that while other fetch and store operations common to cached computer systems, including effects of I/O DMA and multi-processor memory accesses have not been described, the mechanisms of the present invention can be readily extended to include them.

Interrupt Processing

As noted, the LE bit is always set if the endian of the current software task is little endian, and is always cleared if the current software endian is big endian.

Upon initialization, computer system 100 begins in a known endian. During initialization, the operating system typically sets ILE bit 127 to indicate the endian required by interrupt handler 171 (i.e., whether interrupt handler 171 is a big endian task or a little endian task). ILE bit 127 is required for interrupt handling because processor 101 may be required to handle an interrupt at any time. During a context switch from a current software task to interrupt handler 171, a problem arises if the current software task is running in an endian which is different from that of interrupt handler 171. During the context switch, control is atomically passed from the current software task to interrupt handler 171, and processor 101 must therefore also atomically change whether or not data endian conversion is to be performed. ILE bit 127 of the present invention allows the processor to correctly interpret data in main memory during a context switch while interrupt handler 171 has control of processor 101.

Figure 7:
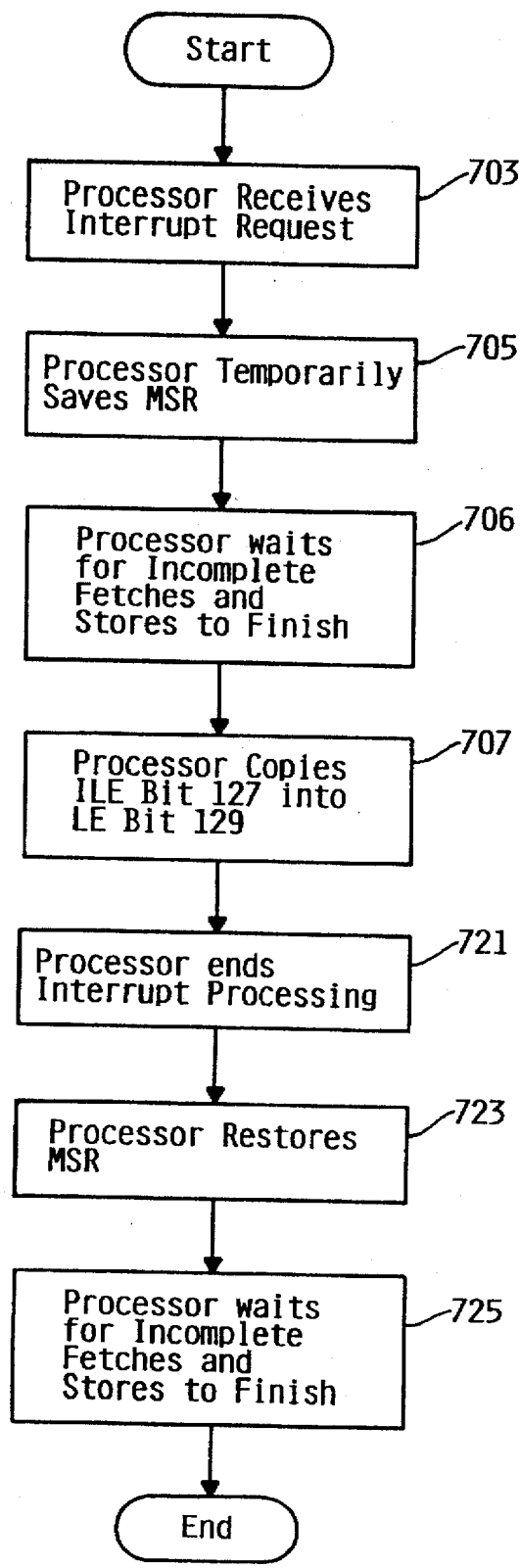
FIG. 7 is a high level logic diagram that describes how the mixed endian circuitry of the preferred embodiment interacts with the interrupt handler of the preferred embodiment.

A preferred interrupt processing method for the mixed-endian computer system of the present invention is shown in FIG. 7. Processor 101 receives an interrupt request at 703. As part of the context switch, MSR 105 is saved in a temporary location [block 705]. In highly pipelined machines data itches and stores may have been successfully translated, but actual processing (e.g., see 625 of FIG. 6b) may still be pending for one or more operations. If so processor 101 waits for such operations to finish [block 706]. ILE bit 127 is copied to the LE bit 129 [block 707]. Note again that any prior memory operations must have completed before ILE bit 127 is then copied to LE bit 129, and then the new value of LE bit 129 must control subsequent memory fetches. In other words, the value change of LE bit 129 is atomic. This is similar to interrupt handling for other typical interrupts commonly processed by current processors except for the critical observation that designers designing to bi-endian and not mixed endian rules may deliberately or accidentally design the processor in such a way as to fail to meet these mixed endian requirements on some pathways. A reliable mixed endian machine must ensure all pathways and cache optimizations meet the above mentioned atomicity requirements; a bi-endian machine need only meet these requirements for a single well defined interrupt. Once the interrupt routine is running, fetches and stores occur as described above using the new value of LE bit 129 (i.e., as described in FIGS. 6a and 6b).

Upon completion of interrupt processing [block 721], MSR 105 is restored [block 723], the processor waits for incomplete fetches and stores to complete [block 725] and execution of the current software task continues at the point before the context switch. As described above, any change of LE from its old value to its new value must be atomic. It is assumed that there is a return from interrupt instruction which restores the saved MSR, and atomically resumes from the interrupt processing of the interrupted instruction.

Consistent Memory Image

It should be noted here that the mechanisms of the present invention provide for a consistent image in main memory while still providing for mixed-endian operation. A consistent main memory image is one in which the data image of main memory is consistent with that found in auxiliary storage. A consistent memory image is important for providing mixed-endian operation in a multi-processor environment. Multi-processor environments often involve multiple processors running in a single computer system with a single, shared main memory. Sometimes the processors, e.g., service processors, are from different makers, which means that some processors may or may not even have bi-endian capability or be of the same endian. However, regardless of the "endianness" or capabilities of the processors involved, it is valuable that the main memory image be consistent with that of auxiliary storage so that the data is not unexpectedly in reflected format when it is accessed by the various tasks executing on the various processors. Indeed, even if all of the processors were of the same kind, it would still be important to maintain a consistent memory image so that all tasks know what to expect when accessing main memory.

General Applicability

It is important to note here that while the examples set forth above involved the use of data stored on auxiliary storage devices such as rotating disks, the present invention is not limited in applicability to this type of storage device. Indeed, those skilled in the art will appreciate and understand that the present invention applies equally to any means of storing or communicating both big and little endian data on/to a single computer system.

For example, the embodiments of the mixed endian computer system disclosed herein would perform equally as well in an environment where data was passed between bus connected computer systems or processors because in the end the passed data would still be loaded into cache memory 103 and main memory 109 by big endian programs 155 and/or little endian programs 160. Similarly, data that was received from an external computer network via communications interface 147 would similarly need to be loaded into cache memory 103 and main memory 109 by big endian programs 155 and/or little endian programs 160.

For the purposes of straightforward illustration, the examples of integer data set forth in this specification utilize only aligned data, those skilled in the art will appreciate the concepts and techniques described herein are readily extendable to unaligned data (e.g., a 16 bit integer beginning on an odd address boundary) and that unaligned data cases are within the spirit and scope of the present invention.

Big and Little Endian Instructions

While it has been implied throughout this specification, it should be explicitly noted here that the mechanisms of the present invention are also used to allow tasks of different endian to both execute on computer system 100. Since in PowerPC and other like computer systems the instructions of big endian programs are in big endian format and the instructions of little endian programs are in little endian format, the above-described reflection and address modification is necessary to allow little endian tasks to execute on the enhanced PowerPC processor of the present invention.

Given that instructions are really data from the perspective of memory, those skilled in the art will understand that the way in which big and little endian instructions are handled by the mechanisms of the present invention is logically identical to the way in which big and little endian data is handled by the mechanisms of the present invention. Accordingly, general details of big and little endian instruction handling are not reiterated here. However, it is worthwhile to point out that the instruction cache of computer system 100, which while not shown on FIG. 1 is known to be included in PowerPC computer systems, would be used instead of cache memory 103 for handling instructions. It is also worthwhile to point out that since instructions are always the size of a single word, the XOR 4 address modification shown in FIG. 3b would be the only address modification used. Of course, this latter address modification statement is one of practical use, not one of applicability of the present invention. Those skilled in the art will appreciate that the present invention applies equally to instructions of different sizes, even if the instructions are smaller or larger in size than that denoted in FIG. 3b, and even if the instructions were designed to be in a fixed endian, big or little, but accessing data in the endian implied by the LE bit equivalent.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer system, said computer system comprising:
   means for initiating a first request for data, said request being initiated by a first program of a particular endian type, said first program executing as a task on a processor;
   means for copying said data from main memory into cache memory;
   means for reflecting said data;
   means for presenting said data to said first program;
   means for storing said data back into said cache; and
   means for storing an indication that said data was reflected in said reflecting step.

2. The computer system of claim 1 further comprising the steps of:
   means for initiating a second request for said data, said request being initiated by a second program of said particular endian type, said first program executing as a task on a processor;
   means for recognizing that said second program and said first program are of said particular endian type; and
   means for presenting said data to said second program.

3. The computer system of claim 1 further comprising the steps of:
   means for initiating a second request for said data, said request being initiated by a second program of a different endian type, said first program executing as a task on a processor;
   means for recognizing that said second program and said first program are of different endian type;
   means for reflecting said data;
   means for storing said data into said main memory;
   means for copying said data from said main memory into said cache memory; and
   means for presenting said data to said second program.

4. A computer system, said computer system comprising:
   a processor;
   main memory;
   cache memory; and
   data, said data being of a particular endian type, said data being reflected when presented to a first program that is of a different endian type, said data being stored back into said cache memory after presentation to said program, an indication of whether said data has been reflected being stored in said cache memory.

5. The computer system of claim 4 wherein said indication is used to force a cache miss when said data is in reflected form and subsequently requested by a second program that requires that said data not be in said reflected form.

6. The computer system of claim 5 wherein said data in reflected form is reflected before being stored into said main memory.

7. The computer system of claim 6 wherein said data is not reflected when copied in cache memory for ultimate presentation to said second program.

8. A computer-implemented method, said method comprising the steps of:
   initiating a first request for data, said request being initiated by a first program of a particular endian type, said first program executing as a task on a processor;
   copying said data from main memory into cache memory;
   reflecting said data;
   presenting said data to said first program;
   storing said data back into said cache; and
   storing an indication that said data was reflected in said reflecting step.

9. The computer-implemented method of claim 8 further comprising the steps of:
   initiating a second request for said data, said request being initiated by a second program of said particular endian type, said first program executing as a task on a processor;
   recognizing that said second program and said first program are of said particular endian type; and
   presenting said data to said second program.

10. The computer-implemented method of claim 8 further comprising the steps of:
    initiating a second request for said data, said request being initiated by a second program of a different endian type, said first program executing as a task on a processor;
    recognizing that said second program and said first program are of different endian type;
    reflecting said data;
    storing said data into said main memory;
    copying said data from said main memory into said cache memory; and
    presenting said data to said second program.

* * * * *